US010699229B2

(12) United States Patent
Kumar et al.

(10) Patent No.: US 10,699,229 B2
(45) Date of Patent: Jun. 30, 2020

(54) USER SEGMENTATION FOR COST-BASED DEPLOYMENT OF ENTERPRISE INFRASTRUCTURE

(71) Applicant: TATA CONSULTANCY SERVICES LIMITED, Mumbai, Maharashtra (IN)

(72) Inventors: Mohan Raj Velayudhan Kumar, Pune (IN); Sandip Sadashiv Jadhav, Pune (IN); Rahul Ramesh Kelkar, Pune (IN); Harrick Mayank Vin, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1172 days.

(21) Appl. No.: 14/208,020

(22) Filed: Mar. 13, 2014

(65) Prior Publication Data

US 2014/0297352 A1 Oct. 2, 2014

(30) Foreign Application Priority Data

Mar. 26, 2013 (IN) .......................... 1162/MUM/2013

(51) Int. Cl.
*G06Q 10/06* (2012.01)
(52) U.S. Cl.
CPC ............................. *G06Q 10/06315* (2013.01)
(58) Field of Classification Search
USPC ............................................... 705/7.11–7.42
See application file for complete search history.

(56) References Cited

U.S. PATENT DOCUMENTS

| 8,032,757 | B1 * | 10/2011 | Zhao | .................. | G06F 21/6272 |
| | | | | | 380/28 |
| 8,386,792 | B1 * | 2/2013 | Zhao | ...................... | G06F 21/64 |
| | | | | | 713/180 |
| 2008/0221987 | A1 * | 9/2008 | Sundaresan | ........... | G06Q 30/02 |
| | | | | | 705/14.54 |

(Continued)

OTHER PUBLICATIONS

U, et al., "A Robust Image Watermarking Algorithm based on Non-Uniform Rectangular Partition and Encryption Scrambling", Faculty of Information Technology, Macau University of Science and Technology, Macau China, 2009.*

(Continued)

*Primary Examiner* — Amber A Misiaszek
(74) *Attorney, Agent, or Firm* — Hamre, Schumann, Mueller & Larson, P.C.

(57) ABSTRACT

Described herein, is a method for user segmentation for cost-based deployment of enterprise infrastructure. According to an implementation, for each of the users, a user fingerprint (UFP) score set comprising rating scores that quantify levels of enterprise-level needs of the each user is determined. For each of deployment solutions of the enterprise, a deployment fingerprint (DFP) score set comprising rating scores that quantify levels of capabilities of the each deployment solution enabled to meet enterprise-level needs of the users is determined. The users are grouped into user segments based on the UFP score sets of the users. A definition of each of the user segments is determined. The definition is indicative of a user whose enterprise-level needs define characteristics of the corresponding user segment. A number of user segments is found based on a cost associated with the deployment solutions for the user segments.

10 Claims, 2 Drawing Sheets

(56) References Cited

U.S. PATENT DOCUMENTS

2014/0101717 A1* 4/2014 Hajost ..................... G06F 8/71
                                                                  726/1
2015/0095999 A1* 4/2015 Toth ........................ H04L 63/08
                                                                  726/6

OTHER PUBLICATIONS

Balfanz, Dirk, "Network-in-a-Box: How to Set Up a Secure Wireless Network in Under a Minute", 13th USENIX Security Symposium, San Diego, CA, pp. 1-23, Nov. 2004. (Year: 2004).*
Tsiptsis et al., "Data Mining Techniques in CRM: Inside Customer Segmentation", John Wiley & Sons, Ltd., 2009, pp. 1-370.

* cited by examiner

USER SEGMENTATION FOR COST-BASED DEPLOYMENT OF ENTERPRISE INFRASTRUCTURE

TECHNICAL FIELD

The present subject matter relates to segmentation of users in an enterprise for providing enterprise infrastructure and, particularly but not exclusively, to segmentation of users for cost-based deployment of enterprise infrastructure.

BACKGROUND

Enterprises generally deploy Information Technology (IT) infrastructure for their employees or users to access enterprise IT applications. Advances in technology in terms of communication, mobility, modem end point devices, etc., have changed enterprise-level IT needs of employees or users for accessing the enterprise IT applications. In an enterprise, different users may have different IT needs with respect to the type of device, the type of network connection, the type of operating system, and the like, depending on their job roles, working habits, and such. The enterprise provides tools, services and policies as a part of IT infrastructure to cater to the diverse needs of the users. In order to define the tools, the services and the policies that can be provided to different users, the users are grouped or segmented together in multiple user segments depending on similarities in their needs. The segmentation of users and the provisioning of IT infrastructure specific to each of the user segments have a positive impact on users' working experience and productivity.

SUMMARY

This summary is provided to introduce concepts related to user segmentation for cost-based deployment of enterprise infrastructure. This summary is neither intended to identify essential features of the claimed subject matter nor is it intended for use in determining or limiting the scope of the claimed subject matter.

In accordance with an implementation of the present subject matter, a method for user segmentation for cost-based deployment of enterprise infrastructure is described. For each of the users, a user fingerprint (UFP) score set comprising rating scores that quantify levels of enterprise-level needs of the each user is determined. The enterprise-level needs are associated with a plurality of work characteristics of the users for working in the enterprise. For each of deployment solutions of the enterprise, a deployment fingerprint (DFP) score set comprising rating scores that quantify levels of capabilities of the each deployment solution enabled to meet enterprise-level needs of the users is determined. The deployment solutions define the enterprise infrastructure provided to the users. The users are grouped into user segments based on the UFP score sets of the users. Each of the user segments groups users, from amongst the users, having the UFP score sets relative closer to each other than the UFP score sets of other users. A definition of each of the user segments is determined. The definition is indicative of a user whose enterprise-level needs define characteristics of the corresponding user segment. Further, a number of user segments are found based on a cost associated with the deployment solutions for the user segments for deployment of the enterprise infrastructure. The cost is computed based on definitions of the user segments, the UFP score sets of the users and the DFP score sets of the deployment solutions.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some implementations of systems and/or methods in accordance with the present subject matter are now described, by way of example only, and with reference to the accompanying figures, in which.

Figure 1:
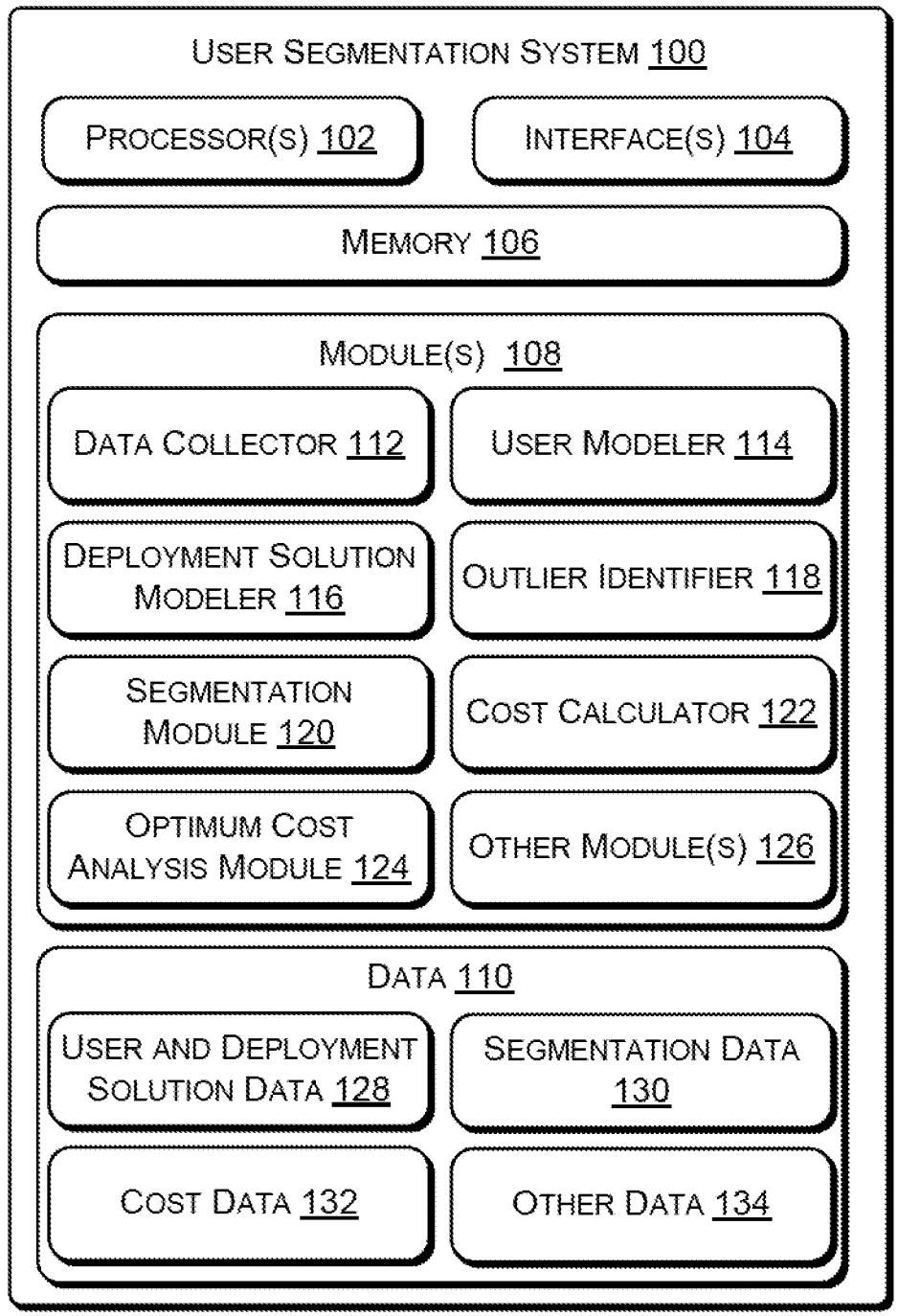
FIG. 1 illustrates a user segmentation system, according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

The present subject matter relates to methods and systems for user segmentation for cost-based deployment of enterprise infrastructure. User segmentation is a process of grouping users together in clusters or segments based on similarly in their enterprise-level needs. For the purposes of the present subject matter, the users may be understood as employees or end-users accessing IT applications of an enterprise, and the enterprise-level needs may be understood as IT needs of the users for accessing the IT applications. In an example, enterprise-level needs may include type of device used, ownership of the device, type of connection, mobile connectivity, security level of communication, and such. The enterprise infrastructure may include IT infrastructure, such as tools, services, and policies, provided to the users for accessing IT applications.

With increasing globalization, enterprises are becoming more complex with large number of users working from multiple locations. In view of the large number of users in an enterprise and diversity in their needs and tools used, the IT infrastructure is usually not defined or provided based on the needs of each of the users individually as this may increase the complexity of the enterprise IT environment. So, typically, users with similar needs are grouped into user segments. The enterprise designs deployment solutions that define tools, services, and policies, as a part of IT infrastructure, enabled to cater to the needs of the users in the user segments. The enterprise generally has more than one deployment solution. One deployment solution may be enabled to meet the needs of users from one or more user segments.

Conventionally, users in an enterprise are segmented heuristically into a predefined number of user segments and based on predefined user segment characteristics. The user segment characteristics govern the basis on which the users can be segmented, and the users are grouped in a user segment around the corresponding user segment characteristic. In an example, the user segment characteristics may include designation of user, job roles of user, and such. The predefined number of user segments and the predefined user segment characteristics vary depending on domain or geography or size of the enterprise and require support of domain or subject matter experts. Generalization of the predefined number of user segments and the corresponding characteristics across the domain or the geography or the size of the enterprise is a substantially difficult task.

Further, some conventional methods for user segmentation do not refer to user data that convey the actual IT needs of the users. In such cases, the segmentation is done by subject matter experts based on intuitions and/or expert opinions. This may lead to incorrect segmentation of users for the purposes of designing efficient deployment solutions.

Further, each of the deployment solutions has a deployment cost associated with it. The cost depends on IT infrastructure defined by the deployment solution for meeting the needs of the users in the user segments. The overall cost of the deployment solutions may depend on the number of user segments. Higher number of user segments leads to better working experience and productivity of the users, but at a higher deployment cost. With a lower number of user segments, the working experience and productivity of the user may be poor, but the deployment cost is low. Conventionally, no cost modeling is performed to optimize the number of user segments and optimize the cost of the deployment solutions for the user segments.

The present subject matter describes methods and systems for segmentation of users of an enterprise for cost-based deployment of enterprise IT infrastructure to cater to enterprise-level needs of the users. The enterprise-level needs may hereinafter be referred to as the needs.

In accordance with the methods and the systems of the present subject matter, user data associated with a plurality of work characteristics of the users are collected. The user data may be for the needs of the users corresponding to the work characteristics. The work characteristics refer to the categories under which users' needs can be classified. In an example, work characteristic may refer to the category feature "device" that can classify the types of devices users may need. The types of devices may include laptop, desktop, tablet, and the like. In another example, work characteristic may refer to the category feature "Connectivity" that can classify the types of connections users may needs. The types of connection options may include WiFi, 3G, 4G, and the like. Based on the collected user data, the needs of users are identified under various category features. The identified needs refer to the actual needs of the users for working in the enterprise.

Further, based on the identified needs, users are grouped into user segments. The users are segmented into user segments in an automated manner by putting the users, according to similarity in their identified needs, iteratively in user segments. Collecting the user data, identifying the user needs, and segmenting the users based on similarities in the actual needs facilitate in creating substantially realistic user segments. The process of segmentation of the present subject matter does not rely on predefined number of user segments and predefined user segmentation characteristics around which segments are otherwise created. This facilitates in segmenting the users with substantial uniformity across the domain, the geography, the size of the enterprise. Also, automated segmentation of users helps in reducing or substantially eliminating the manual efforts of subject matter experts which are otherwise required for the segmentation.

The enterprise may have multiple deployment solutions, each defining different combinations of IT infrastructure, including tools, services, and policies, that can be provided to the users in user segments. The number of deployment solutions is generally less than the number of user segments for an enterprise. The combinations of IT infrastructure defined in each deployment solution convey the capability of that deployment solution in meeting the IT needs of the users. The IT infrastructure and the capabilities of each deployment solution may be categorized based on the possible work characteristics of the users. In an example, work characteristic may refer to the category feature "device" under which the types of devices the deployment solution offers to the users can be classified. The types of devices may include laptop, desktop, tablet, and the like. In another example, work characteristic may refer to the category feature "Connectivity" under which the types of connections the deployment solution offers to the users can be classified. The types of connection options may include WiFi, 3G, 4G, and the like.

With the user segments, costs of deployment solutions for multiple combinations of user segments are computed. The costs are computed in an automated manner for different combinations of user segments, for example, by iteratively removing user segments one by one till combination has the number of user segments equal to the number of deployment solutions. Such computation of costs facilitates in determining the number of user segments for which the costs of deployment solutions is optimum. Such number of user segments may be referred to as a cost optimal number of user segments. In an example, the cost optimal number may be a reduced number of user segments, less than the user segments created based on the needs, for which the cost of deployment solutions is minimum.

In an implementation, the user needs for each of the users are identified as a user fingerprint (UFP) score set. A UFP score set is determined for each user, where the UFP score set has a set of rating scores that quantify levels of the identified needs of that user. In an implementation, the capabilities of the deployment solutions are identified as a deployment fingerprint (DFP) score set. A DFP score set is determined for each deployment solution, where the DFP score set has a set of rating scores that quantify levels of capabilities of that deployment solution. The UFP score sets and the DFP score sets can be used for the purpose of segmentation of users and computation of cost of deployment solutions, in accordance with the present subject matter.

Further, in an implementation, the methods and the systems allow in identifying outlier users for which users' needs cannot be met by the deployment solutions under consideration. Based on the identification of the outlier users, either the outlier users are not considered for the user segmentation, or the needs of the outlier users are modified so that the needs can be met by at least one deployment solution, or the capabilities of at least one deployment solution may be modified to meet the needs of the outlier users, or one or more new deployment solutions may be designed for the outlier users. The identification of outlier users facilitates in creating user segments where each user segment has users with substantially similar needs than can be met by the one or more deployment solutions.

Further, in an implementation, the methods and the systems allow in identifying outlier user segments for which the needs of the users therein cannot be met by the deployment solutions. Based on the identification of the outlier user segments, either the outlier user segments are not considered for the cost optimization computations, or the needs of the users in the outlier user segments are modified so that they can be met by at least one deployment solution, or the capabilities of at least one deployment solution may be modified to meet the needs of the users in the outlier user segments, or new deployment solution may be designed for the outlier user segments. In an implementation, based on the outlier user segments, if the user needs are modified, or the capabilities of the deployment solutions are modified, or new deployment solutions are designed, then the process of user segmentation is repeated to create revised user segments. The identification of outlier user segments facilitates in determining the optimized number of user segments for which the cost of deployment solutions is optimum.

These and other advantages of the present subject matter would be described in greater detail in conjunction with the following figures. It should be noted that the description and figures merely illustrate the principles of the present subject matter.

FIG. 1 illustrates a user segmentation system 100, according to an implementation of the present subject matter. The user segmentation system 100, hereinafter referred to as the system 100, is configured to perform functions associated with segmentation of users of an enterprise according to similarities in their needs and with finding a number of user segments for which the cost of deployment solutions is optimum. The system 100 may be implemented in a computing device, such as a desktop computer, a laptop, a tablet, a personal digital assistant, a server, and the like.

In an implementation, the system 100 includes processor(s) 102. The processor(s) 102 may be implemented as microprocessors, microcomputers, microcontrollers, digital signal processors, central processing units, state machines, logic circuitries, and/or any devices that manipulate signals based on operational instructions. Among other capabilities, the processor(s) 102 fetch and execute computer-readable instructions stored in a memory. The functions of the various elements shown in FIG. 1, including any functional blocks labeled as "processor(s)", may be provided through the use of dedicated hardware as well as hardware capable of executing non-transitory machine readable instructions. Moreover, the term processor may implicitly include, without limitation, digital signal processor (DSP) hardware, network processor, application specific integrated circuit (ASIC), field programmable gate array (FPGA), read only memory (ROM) for storing non-transitory machine readable instructions, random access memory (RAM), non-volatile storage. Other hardware, conventional and/or custom, may also be included.

The system 100 also includes interface(s) 104. The interface(s) 104 may include a variety of machine readable instruction-based and hardware-based interfaces that allow the system 100 to interact with other devices, including web servers, data sources and external repositories, for the purpose of user segmentation. Further, the interface(s) 104 may enable the system 100 to communicate with other communication devices, such as network entities, over a communication network.

Further, the system 100 includes memory 106, coupled to the processor(s) 102. The memory 106 may include any computer-readable medium including, for example, volatile memory (e.g., RAM), and/or non-volatile memory (e.g., EPROM, flash memory, etc.).

Further, the system 100 includes module(s) 108 and data 110. The modules 108 may be coupled to the processor(s) 102. The module(s) 108, amongst other things, include routines, programs, objects, components, data structures, and the like, which perform particular tasks or implement particular abstract data types. The module(s) 108 further include modules that supplement applications on the system 100, for example, modules of an operating system. The data 110 serves, amongst other things, as a repository for storing data that may be fetched, processed, received, or generated by the module(s) 108. Although the data 110 is shown internal to the system 100, it may be understood that the data 110 can reside in an external repository (not shown in the figure), which may be coupled to the system 100. The system 100 may communicate with the external repository through the interface(s) 104 to obtain information from the data 110.

In an implementation, the module(s) 108 of the system 100 includes a data collector 112, a user modeler 114, a deployment solution modeler 116, an outlier identifier 118, a segmentation module 120, a cost calculator 122, an optimum cost analysis module 124, and other module(s) 126. In an implementation, the data 110 of the system 100 includes user and deployment solution data 128, segmentation data 130, cost data 132, and other data 134. The other module(s) 126 may include programs or coded instructions that supplement applications and functions, for example, programs in the operating system of the system 100, and the other data 134 comprise data corresponding to other module(s) 126.

For the purpose of segmentation of users of an enterprise, the data collector 112 collects user data associated with a plurality of work characteristics of the users for working in the enterprise. In an implementation, the user data may be collected from one or more sources, such as surveys, application and device usage data, frequency of usage, event logs, ownership details, and inventory data. For this, the data collector 112 may communicatively couple with one or more other computing devices or databases. The collected user data is stored in the user and deployment solution data 128.

In an example, the data collector 112 may collect the user data based on a survey conducted for the users. The survey may be in the form of a questionnaire for which responses are provided, for example, by the users. Table 1 illustrates an example survey with questions and corresponding answers. The data of the survey for all the users is collected by the data collector 112. It may be understood that the questions and the answers illustrated in Table 1 are for description purposes; however, other questions and answers are also possible.

TABLE 1

| User Data Survey | |
| --- | --- |
| User Name: — | |
| User Designation: — | |
| . . . | |
| Question | Answer |
| Do you prefer to use your device at work? | Yes |
| What type of device do you prefer to use? | Laptop, Tablet |
| What operating systems do you prefer to work with? | Windows, Linux, Android |
| What type of connection do you prefer? | WiFi, 3G |
| . . . | . . . |
| . . . | . . . |

The data collector 112 identifies needs of the users from the collected user data. In an implementation, the data collector 112 identifies category features under which users' needs can be defined or classified, and identifies user requirement attributes under each of the category features. The user requirement attribute define the needs of the users. The user requirement attributes may be understood as the actual needs as conveyed by the users. The feature categories may be common for all the users. The user requirement attributes are identified for all the users under all the features. Table 2 illustrates details of example category features and example user requirement attributes under the category features identified from the user data. It may be understood that the category features and the user requirement attributes in Table 2 are for description purposes; however, other category features and user requirement attributes are also possible. In an example, the category features may include application class, network architecture, connectivity, device, device ownership, operating system, mode of access, application access mode, device access mode, and such. The identified category features and the identified user requirement attributes for the users are stored in the user and deployment solution data 128.

TABLE 2

| | | Category Features | | | |
|---|---|---|---|---|---|
| Users | Device | Operating System | Device Ownership | Connectivity | ... |
| User 1 | Laptop | Windows | Self | WiFi/3G | ... |
| User 2 | Desktop | Windows/Linux | Enterprise | WiFi | ... |
| User 3 | Laptop-Tablet | Linux/Android | Self/Enterprise | WiFi/2G | ... |
| ... | ... | ... | ... | ... | ... |
| ... | ... | ... | ... | ... | ... |

In an example, for identification of the category features and the user requirement attributes from the user data, a predefined list of category features and predefined combinations of attributes that can define each of the category features may be referred. The predefined combinations of attributes includes the combinations of IT infrastructure options which are possible under the category feature. Table 3 illustrates an example predefined list of category features and example predefined combinations of attributes possible for each of the example category features. It may be understood that the predefined list of category features and the predefined combinations of attributes in Table 3 are for description purposes; however, other predefined list of category features and predefined combinations of attributes are also possible. The predefined list of category features and the predefined combinations of attributes are stored in the user and deployment solution data 128 for reference.

TABLE 3

| Category features | Combinations of attributes |
|---|---|
| Device | Desktop, Laptop, Tablet, Desktop/Laptop, Desktop/Tablet, Laptop/Tablet, Desktop/Laptop/Tablet |
| Operating System | Windows, Linux, Android, Windows/Linux, Windows/Android, Linux/Android, Windows/Linux/Android |

TABLE 3-continued

| Category features | Combinations of attributes |
|---|---|
| Device Ownership | Self, Enterprise, Self/Enterprise |
| Connectivity | WiFi, 2G, 3G, WiFi/2G, WiFi/3G, 2G/3G, WiFi/2G/3G |
| ... | ... |
| ... | ... |

In an example, the user data may be collected from more than one source. In such cases, the user data from the sources may be collated, and the category features and the user requirement attributes may be collectively obtained from all the user data. In an implementation, redundancy in the identified category features and in the identified user requirement attributes may be removed. Further, in an implementation, in cases where same category feature and/or same user requirement attributes are identified from two or more sources, then the quality and integrity of the sources may be weighed for and accordingly the sources are used for data identification. In an example, the redundancy removal and/or weighing up of the sources for the data identification may be done manually or through automated predefined rules.

The user modeler 114 quantifies levels of the needs of each of the users, which are identified from the collected user data. For this, user modeler 114 determines a user fingerprint (UFP) score set for each of the users. The UFP score set for a user is a set of rating scores that quantify levels of the identified needs of that user. For determining the UFP score set for each of the users, the user modeler 114 determines the rating scores associated with the identified user requirement attributes under the category features. In a UFP score set, one rating score is for the user requirement attributes under one of the category features.

In an example, the rating scores in the UFP score sets are determined from predefined look-up tables, where a predefined look-up table has pre-filled normalized rating scores for the predefined combinations of attributes (see Table 3) that define the types of one category feature. The normalized rating score for a predefined combination of attributes under one category feature is indicative of a weightage of that combination of attributes from the IT infrastructure deployment perspective. For determining a rating score associated with user requirement attributes under a category feature for a user, the user requirement attributes are matched with the predefined combinations of attributes in the predefined look-up table corresponding to that category feature. The normalized rating score of the predefined combination of attributes in the look-up table, which matches with the user requirement attributes is taken as the rating score for the user requirement attributes under the category feature.

The predefined look-up tables for all the features are provided for all the category features for the determination of UFP score sets for the users. The predefined look-up tables may be stored in the user and deployment solution data 128.

Tables 4a, 4b, 4c and 4d illustrate example predefined look-up tables for some of the category features. Normalized rating scores against the predefined combinations of attributes for the category feature are provided in the Tables 4a, 4b, 4c and 4d.

TABLE 4a

Category features - Device

| Predefined Combinations of Attributes | Normalized Score (%) |
|---|---|
| Desktop | 4.761905 |
| Laptop | 9.52381 |
| Tablet | 19.04762 |
| Desktop/Laptop | 28.57143 |
| Desktop/Tablet | 47.61905 |
| Laptop/Tablet | 57.14286 |
| Desktop/Laptop/Tablet | 100 |

TABLE 4b

Category features - Operatitig System

| Predefined Combinations of Attributes | Normalized Score (%) |
|---|---|
| Windows | 4.761905 |
| Linux | 9.52381 |
| Android | 19.04762 |
| Windows/Linux | 28.57143 |
| Windows/Android | 47.61905 |
| Linux/Android | 57.14286 |
| Windows/Linux/Android | 100 |

TABLE 4c

Category features - Device Ownership

| Predefined Combinations of Attributes | Normalized Score (%) |
|---|---|
| Enterprise | 16.666 |
| Self | 33.333 |
| Self Enterprise | 100 |

TABLE 4d

Category features - Connectivity

| Predefined Combinations of Attributes | Normalized Score (%) |
|---|---|
| WiFi | 4.761905 |
| 2G | 9.52381 |
| 3G | 19.04762 |
| WiFi/2G | 28.57143 |
| WiFi/3G | 47.61905 |
| 2G/3G | 57.14286 |
| WiFi/2G/3G | 100 |

Table 5 illustrates example UFP score sets of the users. The set of rating scores in each row against a user represents the UFP score set for that user. As illustrated, each UFP score set has the rating scores under the category features. The example UFP score sets illustrated in Table 5 are obtained by determining the rating scores based on matching of the example user requirement attributes under the category features illustrated in Table 2 with the predefined combinations of attributes for the category features from the predefined look-up tables illustrated in Tables 4a, 4b, 4c and 4d.

TABLE 5

| | Category Features | | | | |
|---|---|---|---|---|---|
| Users | Device | Operating System | Device Ownership | Connectivity | ... |
| User 1 | 9.52381 | 4.761905 | 33.333 | 47.61905 | ... |
| User 2 | 4.761905 | 28.57143 | 16.666 | 4.761905 | ... |
| User 3 | 57.14286 | 57.14286 | 100 | 28.57143 | ... |
| ... | ... | ... | ... | ... | ... |
| ... | ... | ... | ... | ... | ... |

In an example, the user data may be collected for n number of users, and p number of category features are identified from the user data. The UFP score set for each user can be represented as a vector of 1×p dimension. The UFP score sets for all the n users can be represented as a vector of n×p dimension.

Table 6 illustrates details of obtaining normalized rating scores in a predefined look-up table. The example illustrated in Table 6 is for the look-up table for the category feature "Device". The look-up tables for other category features can be obtained in similar manner.

As illustrated, the category feature "Device" has three possible attributes: "Desktop", "Laptop" and "Tablet" with various combinations of attributes shown in the first column. Weightage are assigned to each of attributes based on importance of that attribute from the IT infrastructure perspective. The weightage may be assigned in binary order, i.e., as powers of 2. A distribution set comprising values of 0 and 1 is assigned to each combination of attributes based on the presence of attributes in that combination. For each combination of attributes, the net value is obtained by multiplying each value in the distribution set with the corresponding weightage the net value. Further, a level weight is assigned to each combination of attributes. The level weight is equal to the number of attributes present in that combination of attributes. The level weight and the net value are multiplied respectively for each of the combination of attributes. The multiplied value for each combination of attributes is normalized with respect to that combination of attributes which has all the attributes possible under the category feature.

TABLE 6

| | Category features - Device | | | | | | |
|---|---|---|---|---|---|---|---|
| | Tablet | Laptop | Desktop | Net Value | Level Weight | Net Value * Level Weight | Normalized Score (%) |
| Weightage | 4 | 2 | 1 | | | | |
| Desktop | 0 | 0 | 1 | 1 | 1 | 1 | 4.761905 |
| Laptop | 0 | 1 | 0 | 2 | 1 | 2 | 9.52381 |
| Tablet | 1 | 0 | 0 | 4 | 1 | 4 | 19.04762 |
| Desktop/Laptop | 0 | 1 | 1 | 3 | 2 | 6 | 28.57143 |
| Desktop/Tablet | 1 | 0 | 1 | 5 | 2 | 10 | 47.61905 |
| Laptop/Tablet | 1 | 1 | 0 | 6 | 2 | 12 | 57.14286 |
| Desktop/Laptop/Tablet | 1 | 1 | 1 | 7 | 3 | 21 | 100 |

In an implementation, a weightage factor of each of category features is defined and the rating scores under the each category feature in the UFP score sets are multiplied with the weightage factor of the respective category feature.

The weightage factor of a category feature defines the contribution or the influence of that category feature with respect to other category features on the user segmentation. The weightage factor of a category feature may take a value from 0.1, between 0 and 1, or more than 1. The weightage factor of a value 0 means that the corresponding category feature is not accounted or considered for the user segmentation process. The weightage factor of a value 1 means that the corresponding category feature has an influence equal to the other category features for the user segmentation. The weightage factor of a value between 0 and 1 means that the corresponding category feature has less influence than other category feature for the user segmentation. The weightage factor of a value more than 1 means that the corresponding category feature has more influence than other category feature for the user segmentation.

Further, the data collector 112 collects enterprise data associated with capabilities of deployment solutions deployed for meeting the needs of the users in the enterprise. In an implementation, the enterprise data may be collected from one or more sources, such as surveys, and inventory data. For this, the data collector 112 may communicatively couple with one or more other computing devices or databases. The collected enterprise data is stored in the user and deployment solution data 128.

From the collected enterprise data, the data collector 112 identifies category features under which deployment solution capabilities can be defined, and identifies capability attributes under each of category feature for each of the deployment solutions. The capability attributes define the capabilities of the deployment solutions, and may be understood as the actual capabilities as conveyed for the deployment solutions. In an example, the feature categories may be common for all the deployment solutions, and may also be same as that identified from the user data. Table 7 illustrates details of example category features and example capability attributes under the category features identified from the enterprise data. It may be understood that the category features and the capability attributes in Table 7 are for description purposes; however, other category features and capability attributes are also possible. The identified category features and the identified capability attributes for the deployment solutions are stored in the user and deployment solution data 128.

TABLE 7

| Deployment Solutions | Category Feature | | | | |
|---|---|---|---|---|---|
| | Device | Operating System | Device Ownership | Connectivity | ... |
| Solution 1 | Laptop | Windows | Self | WiFi | ... |
| Solution 2 | Laptop | Windows | Self | WiFi/2G | ... |
| Solution 3 | Desktop-Laptop-Tablet | Android | Self/Enterprise | WiFi/2G/3G | ... |
| ... | ... | ... | ... | ... | ... |
| ... | ... | ... | ... | ... | ... |

In an example, the category features and the capability attributes for the deployment solutions may be identified by referring to the predefined list of category features and predefined combinations of attributes that can define each of the category features as illustrated in Table 3.

Further, the deployment solution modeler 116 quantifies levels of the capabilities of each of the deployment solutions, which are identified from the collected enterprise data. For this, deployment solution modeler 116 determines a deployment fingerprint (DFP) score set for each of the deployment solutions. The DFP score set for a deployment solution is a set of rating scores that quantify levels of the identified capabilities of that deployment solution. For determining the DFP score set for each of the deployment solutions, the deployment solution modeler 116 determines the rating scores associated with the identified capability attributes under the category features. In a DFP score set, one rating score is for the capability attributes under one of the category features.

In an example, the rating scores in the DFP score sets are determined from the predefined look-up tables, as illustrated earlier. For determining a rating score associated with capability attributes under a category feature for a deployment solution, the capability attributes are matched with the predefined combinations of attributes in the predefined look-up table corresponding to that category feature. The normalized rating score of the predefined combination of attributes in the look-up table, which matches with the capability attributes is taken as the rating score for the capability attributes under the category feature.

Table 8 illustrates example DFP score sets of the deployment solutions. The set of rating scores in each row against a deployment solution represents the DFP score set for that deployment solution. As illustrated, each DFP score set has the rating scores under the category features. The example DFP score sets illustrated in Table 8 are obtained by determining the rating scores based on matching of the example capability attributes under the category features illustrated in Table 7 with the predefined combinations of attributes for the category features from the predefined look-up tables illustrated in Tables 4a, 4b, 4c, and 4d.

TABLE 8

| Deployment Solutions | Category Features | | | | |
|---|---|---|---|---|---|
| | Device | Operating System | Device Ownership | Connectivity | ... |
| Solution 1 | 9.52381 | 4.761905 | 33.333 | 4.761905 | ... |
| Solution 2 | 9.52381 | 4.761905 | 33.333 | 28.57143 | ... |
| Solution 3 | 100 | 19.04762 | 100 | 100 | ... |
| ... | ... | ... | ... | ... | ... |
| ... | ... | ... | ... | ... | ... |

In an example, the enterprise data may be collected for m number of deployment solutions, and p number of category features are identified from the enterprise data. The DFP score set for each deployment solution can be represented as a vector of 1×p dimension. The DFP score sets for all the m deployment solutions can be represented as a vector of m×p dimension. In an example, the number m of deployment solutions is less than the number n of the users in the enterprise.

In an implementation, after determining the UFP score sets for all the users, and determining the DFP score sets for all the deployment solutions, the outlier identifier 118 identifies outlier users. The outlier users are the users for whom the needs identified from the user data cannot be met by the capabilities of the deployment solutions identified from the enterprise data. For identifying the outlier users, the rating scores in the UFP score set for each user are compared with the rating scores in the DFP score sets of all the deployment solutions. In an example, if, for a user, the rating score under one or more category features in the UFP score set is more than the rating scores under the same category features in the DFP score sets, then that user can be the outlier user.

Based on the identification of the outlier users, either of the following actions may be performed: (a) the outlier users are not considered for the user segmentation; (b) the user requirement attributes of the outlier users are modified so that the needs can be met by at least one deployment solution; (c) the capability attributes of at least one deployment solution may be modified to meet the needs of the outlier users; (d) one or more new deployment solutions may be designed for the outlier users. In an implementation, based on the modifications in the user requirement attributes or capability attributes, or by designing new deployment solution(s) for the outlier users, the user modeler 114 and the deployment solution modeler 116 may again determine the revised UFP score sets for the users and the DFP score sets for the deployment solutions.

The segmentation module 120 groups the users into user segments based on the UFP score sets for the users. As mentioned earlier, in an example, the user data may be collected for n number of users, and p number of category features may be identified from the user data. The UFP score set for each user can be represented as a vector of 1×p dimension, and the UFP score sets for all the n users can be represented as a vector of n×p dimension.

The description below describes the process of segmentation of users that may be performed by the segmentation module 120. The steps are as follows.

A vector representing the UFP score sets for all the users is created, and a centroid vector c of the vector representing the UFP score sets is found. The centroid vector c is indicative of central points of distribution of UFP score sets.

Based on the centroid vector c, a UFP score set is identified which farthest from the centroid vector c. The identified farthest UFP score set is denoted as center vector c1. The farthest UFP score set is found by computing the distance between the elements in the UFP score sets and centroid vector c, and the UFP score set for which the distance is maximum is taken as the farthest UFP score set.

Subsequent to this, a distance d1 of each UFP score set with respect to the centroid vector c is computed, and a distance d2 of each UFP score set with respect to the center vector c1 is computed. Based on these computations, the UFP score sets for which the distance d2 is less than the distance d1 are grouped in a cluster D.

After this, a cluster centroid vector c1' of the cluster D is found, and the cluster centroid vector c1' is compared with the center vector c1. If the cluster centroid vector c1' is not equal to the center vector c1, then the center vector c is replaced and the cluster centroid vector c1' is made the new center vector c1. Based on this new center vector c1, the steps of computing the distance d1 and distance d2, grouping more UFP score sets in the cluster D, and again finding the cluster centroid vector c1' are repeated till the cluster centroid vector c1' is equal to the center vector c1 is achieved.

After creating the cluster D, a user segment S1 is created by grouping the users associated with the UFP score sets in the cluster D. With this, the user segment S1 has the users having substantially similar needs identified from the user data. The user segment S1 with information of the users therein is stored.

Subsequent to this, a UFP score set in the cluster D, which is nearest to the center vector c1 is identified. This identified nearest UFP score set is added as an element in a segment centroid set C. This added UFP score set represents a definition of user segment, which is indicative of the characteristic of the user segment around which the users with similar needs are grouped. The definition of a user segment is also indicative of a user whose needs can define characteristics of the user segment around which the users with similar needs are grouped. Such user can be considered as a leader of the user segment, and other users in the user segment have substantially similar needs centralized around the leader. With the process of segmentation of the present subject matter, the characteristic of the user segment is determined based on the actual user data and actual needs of the users. Thus, the process does not require a predefined user segment characteristic for the segmentation of users. The segment centroid set C is stored.

After creating the user segment S1, and adding the definition of the user segment S1 in the segment centroid set C, the vector representing the UFP score sets is revised by eliminating the UFP score sets grouped in the cluster D. With the revised representation of UFP score sets, the steps of identifying of a farthest UFP score set for the same centroid vector c, creating further user segments S2, S3, and so on, and determining definitions of the further user segments to store in the segment centroid set C are iteratively repeated till a predefined exit condition is achieved. The predefined exit condition for this process includes the following: (a) number of UFP score sets in the vector representing the UFP score sets, after an iteration, is zero; or (b) number of UFP score sets in a cluster D is zero; or (c) number of user segments reaches a predefined limit; or (d) number of left-over UFP score sets in the vector representing the UFP score sets, after an iteration, is less than a predefined threshold limit.

The segment centroid set C, obtained after the segmentation process, comprises the definitions of all the user segments. The segment centroid set C and the information associated with the user segments are stored in the segmentation data 130.

In an implementation, after the segmentation of users into user segments and determination of definitions of the user segments, the optimum cost analysis module 124 computes costs associated with the deployment solutions for different combinations of the user segments for finding a number of user segments based on a cost of deployment solutions for the user segments. The cost of the deployment solutions may be computed based on the definitions of the user segments as per the segment centroid set C, based on the UFP score sets of the users, and based on the DFP score sets of the deployment solutions.

The description below describes the process that may be performed by the optimum cost analysis module 124 for finding the number of user segments based on the cost of the deployment solutions. The steps are as follows.

The elements of the segment centroid set C denote the definitions of the user segments created through segmentation process described earlier. At first, the segment centroid set C is set as a first segment centroid set C1, and a first cost of deployment solutions is computed. The first cost is a cost of deployment solutions for the user segments for which the definitions are present in the first segment centroid set C1. The first cost is computed based on the first segment centroid set C1, the UFP score sets of the users, and the DFP score sets of the deployment solutions. The cost is computed by the cost calculator 122 as described later in the description. The first cost and the first segment centroid set C1 are stored as an element of an output set O. The first element in the output set O may be represented as {first cost, C1}.

After this, a centroid vector s of the elements in the segment centroid set C is found. The centroid vector s is indicative of central points of distribution of the elements of the segment centroid set C. Based on the centroid vector s, an average distance $d_c$ between the centroid vector s and all the elements in the segment centroid set C is computed. The distance $d_c$ is computed based on the following equation (1):

$$d_c = \frac{1}{L}\sum_{i=1}^{L} distfunc(s, K_i), \quad (1)$$

where L is the number of user segments created by the segmentation process and $K_i$ is the value of $i^{th}$ element in the segment centroid set C. The distfunc(s, $K_i$) is a function that computes the Euclidean distance between the two centroid vector s and element $K_i$. Average distance $d_c$ between the centroid vector s and all the elements in segment centroid set C is computed in a similar manner.

Subsequent to this, a distance between each pair of elements in the segment centroid set C is computed. Based on this computation, a pair of elements in the segment centroid set C for which the distance is minimum is selected for further processing. The selected elements are set as a first element sim1 and a second element sim2.

Further, if the distance between the pair of selected elements is more than the distance $d_c$, then the output set O is provided for finding the number of user segments based on the cost of the deployment solutions. Alternatively, if the distance between the pair of selected elements is less than the distance $d_c$, then the following steps are executed, where a second segment centroid set C2 is determined by removing the definition corresponding to the first element sim1 from the segment centroid set C1, and a second cost of deployment solutions for the user segments for which the definitions are present in the second centroid set C2 is computed. The second cost is computed based on the second segment centroid set C2, the UFP score sets of the users, and the DFP score sets of the deployment solutions. The second cost and the second segment centroid set C2 are stored as an element of an output set O. The second element in the output set O may be represented as {second cost, C2}.

After this, a third segment centroid set C3 is determined by removing the definition corresponding to the second element sim2 from the segment centroid set C1, and a third cost of deployment solutions for the user segments for which the definitions are present in the third centroid set C3 is computed. The third cost is computed based on the third segment centroid set C3, the UFP score sets of the users, and the DFP score sets of the deployment solutions. The third cost and the third segment centroid set C3 are stored as an element of an output set O. The third element in the output set O may be represented as {third cost, C3}.

Now, if the second cost is less than the third cost, then the definition corresponding to the first element sim1 is removed from the segment centroid set C to get a revised segment centroid set C. And, if the second cost is more than the third cost, then the definition corresponding to the second element sim2 is removed from the segment centroid set C to get a revised segment centroid set C.

After this, the steps of selecting a pair of elements from the revised segment centroid set C for which the inter-distance is minimum, computing further costs (fourth cost, fifth cost, and so on) by removing the definitions, one-by-one, from the segment centroid set C, and storing the computed costs and the respective segment centroid sets as elements in the output set are repeated till the number of definitions in the revised segment centroid set C is more than the number of deployment solutions available for the enterprise, and till the distance between at least one pair of elements in the segment centroid set C is less than the distance $d_c$.

After this, the output set O is provided for finding the number of user segments based on the costs of the deployment solutions. The output set O, obtained after the cost computation process, comprises elements with the costs of deployment solutions for different combinations of user segments and the definitions associated with those combinations of user segments. The output set O is stored in the cost data 132.

Based on the costs of deployment solutions for different combinations of user segments, the number of user segments for which the cost of deployment solutions is optimum can be found. In an implementation, the number of user segments includes that combination of user segment for which the computed cost of deployment solutions is minimum. In an implementation, the different costs may be analyzed for finding the number of user segments for deployment of infrastructure. For example, the cost of deployment solutions may be minimum for a substantially smaller number of user segments which may lead to poor working experience and productivity of the users. In such a case, computed costs of the deployment solutions have to be analyzed with respect to the number of user segments for finding the number of user segments for deployment of enterprise infrastructure.

Further, in the process of finding the number of user segments, the distance between the selected pair of elements in the segment centroid set C is compared with the distance $d_c$. The distance between the selected pair of elements being less than the distance $d_c$ is indicative of an overlap of the needs of the users in the user segments associated with the selected pair of elements. By computing the cost of deployment solutions by individually removing the selected elements from the segment centroid set C, the cost of deployment solutions can be optimized as the costs due to the overlapping needs may get taken care of. In an example, the cost of deployment solutions for one less user segment may be lesser.

The description below describes the process that the cost calculator 122 may perform for computing a cost of deployment solutions based on the segment centroid set C, the UFP score sets of the users, and the DFP score sets of the deployment solutions. Like the UFP score sets, in an example, the DFP score set for each of the deployment solutions can be represented as a vector of 1×p dimension, and the DFP score sets for all the m number of deployment solutions can be represented as a vector of m×p dimension. The steps of the process of cost calculation are as follows.

For computing the cost of deployment solutions for the user segments defined by the definitions in the segment centroid set C, initially, users whose enterprise-level needs are met by the capabilities of each of the deployment solutions are found based on a mapping of the UFP score sets of the users in the user segments and the DFP score sets of the deployment solutions through the definitions of the user segments. For this mapping, the UFP score sets are identified for each definition of the user segments, which are relatively closer to that definition than other definitions, and the definitions of the user segments are identified for each DFP score set which are relatively closer to that DFP score set than other DFP score sets.

The process of mapping of the UFP score sets with the DFP score sets through the definitions is described hereinafter. In an example, let's say the UFP score sets are denoted as $UFP_1, UFP_2, \ldots, UFP_n$ for n number of users, the DPF score sets are denoted as $DFP_1, DFP_2, \ldots, DFP_m$ for m number of deployment solutions, and the definitions in the segment centroid set C are denoted as $K_1, K_2, \ldots, K_L$ for L number of user segments. For the mapping, initially, for each definition $K_i$, the UFP score sets UFP are identified which are relatively closer to the definition $K_i$ than other definitions. The UFP score sets are identified and tracked for all the definitions individually. This mapping between the UFP score sets and the definitions in the segment centroid set C enable in finding the users having similar needs defined around the respective definition. In an implementation, thus mapping can be established based on the user segments $S_1$, $S_2, \ldots S_L$ created by the user segmentation process as described above. After this, for each DFP score set $DFP_i$, the definitions $K_j$ are identified which are relatively closer to the DFP score set $DFP_i$ than other DPF score sets. The definitions are identified and tracked for all the DFP score sets individually. This mapping between the DFP score sets and the definitions in the segment centroid set C enable in finding the user segments for which the needs can be met by the each deployment solution individually.

The above two mappings, one between the UFP score sets and the definitions and the other between the definitions and the DFP score sets, enable in mapping the UFP score sets of the users with the DFP score sets of the deployment solutions. With this, the capabilities of each of the deployment solutions are mapped to the needs of the users which can be fulfilled by those capabilities.

Further, after finding the users whose enterprise-level needs are met by the capabilities of each of the deployment solutions, a to-be inventory of the enterprise infrastructure is determined. The to-be inventory is indicative of the enterprise infrastructure required for enabling the deployment solutions. The to-be inventory defines the enterprise wide capacity sizing needs required to fulfill the needs of the users in the user segments through the deployment solutions. Based on the to-be inventory, the cost of the deployment solutions for the user segments and for fulfilling the needs of the users therein is determined.

In an implementation, predefined deployment solution cost computation rules may be applied to compute the cost of the deployment solutions for the mapping established between the UFP score sets and the DFP score sets. The predefined deployment solution cost computation rules may enable in determining the to-be inventory that governs the capacity sizing needs for the deployment solutions and in determining the cost of deployment solutions based on to-be inventory bill-of-material.

In an implementation, after the segmentation of users into the user segments, the outlier identifier 118 identifies outlier user segments. The outlier user segments are the user segment for which the needs of the users therein cannot be met by the capabilities of the deployment solutions identified from the enterprise data.

In an example, let's say the DPF score sets are denoted as $DFP_1, DFP_2, \ldots, DFP_m$ for m number of deployment solutions, and the definitions in the segment centroid set C are denoted as $K_1, K_2, \ldots, K_L$ for L number of user segments. For identifying the outlier user segments, for each DFP score set $DFP_i$, the definitions $K_j$s which are relatively closer to the DFP score set $DFP_i$ than other DPF score sets are identified. Based on the identified definitions $K_j$s, for each definition $K_j$ the rating scores in the DFP score set $DFP_i$ of the deployment solution are compared with the rating scores in the UFP score sets of the users of the user segment for the definition $K_j$. Based on the comparison, if the rating score under at least one feature for a user is less than the rating score under that feature for the deployment solution, then the definition $K_j$ is not considered for the DFP score set $DFP_i$, and the rest of the identified definitions are assigned to the DFP score set $DFP_i$. Similar analysis is performed for all the DFP score sets. Based on the analysis, the user segments corresponding to the definitions that are not assigned to any of the DFP score set are identified as outlier user segments.

Based on the identification of the outlier user segments, either of the following actions may be performed: (a) the outlier user segments are not considered for the cost computation process; or (b) the user requirement attributes of the users in the outlier user segments are modified so that the needs can be met by at least one deployment solution; or (c) the capability attributes of at least one deployment solution may be modified to meet the needs of the users in the outlier user segments; or (d) one or more new deployment solutions may be designed for the users in the outlier user segments. In an implementation, based on the modifications in the user requirement attributes or capability attributes, or by designing new deployment solution(s) for the outlier user segments, the user modeler 114 and the deployment solution modeler 116 may again determine the revised UFP score sets for the users, the DFP score sets for the deployment solutions, and the segmentation module 120 may again perform the segmentation process for creating revised user segments.

Figure 2:
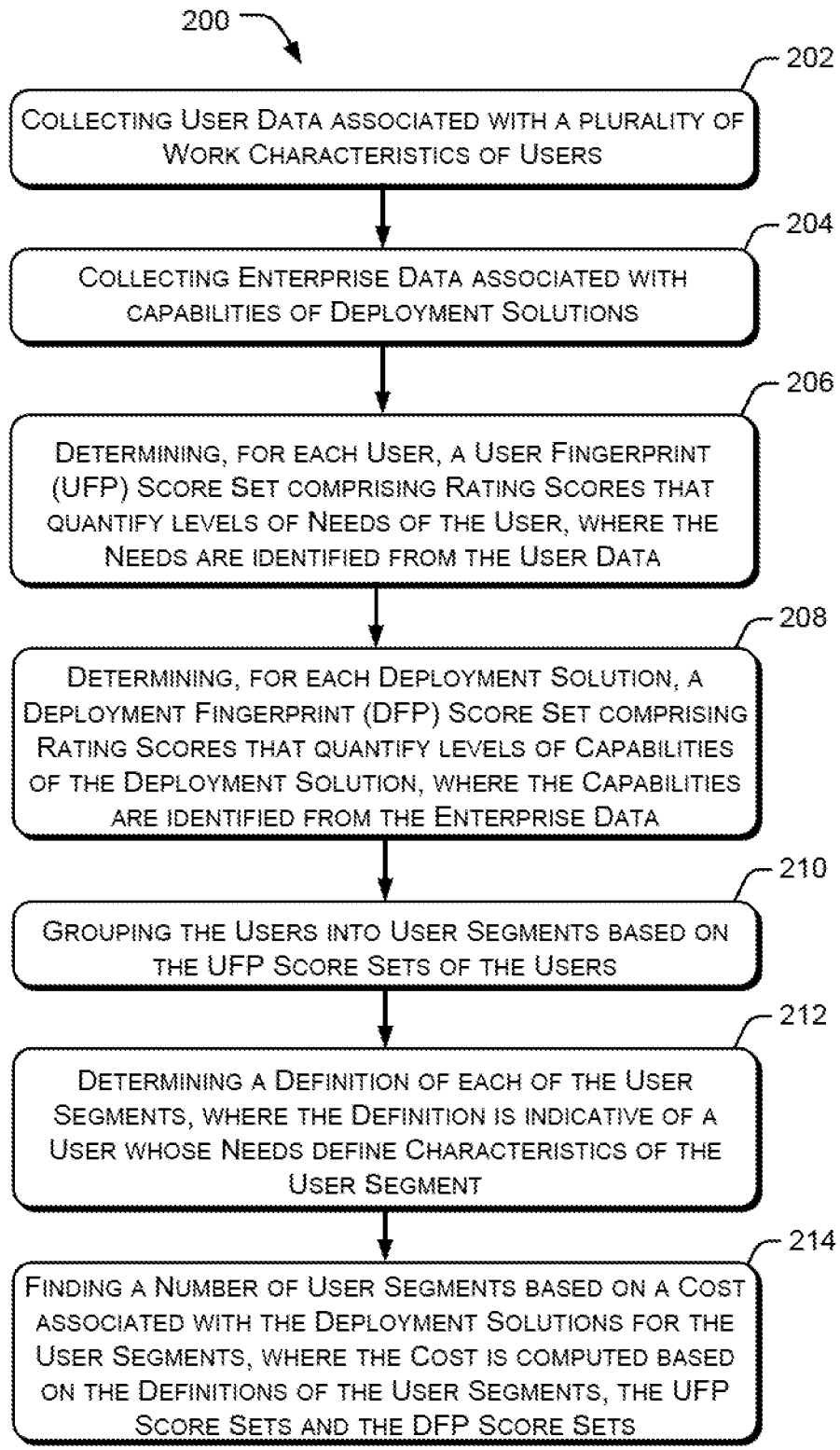
FIG. 2 illustrates a method for user segmentation, according to an implementation of the present subject matter.

FIG. 2 illustrates a method 200 for user segmentation, according to an implementation of the present subject matter. The order in which the method 200 is described is not intended to be construed as a limitation, and any number of the described method blocks can be combined in any order to implement the method 200, or an alternative method. Additionally, individual blocks may be deleted from the method 200 without departing from the spirit and scope of the subject matter described herein.

Furthermore, the method 200 can be implemented by processor(s) or computing devices in any suitable hardware, non-transitory machine readable instructions, or combination thereof. It may be understood that steps of the method 200 may be executed based on instructions stored in a non-transitory computer readable medium as will be readily understood. The non-transitory computer readable medium may include, for example, digital data storage media, digital memories, magnetic storage media, such as a magnetic disks and magnetic tapes, hard drives, or optically readable digital data storage media.

Further, although the method 200 may be implemented in any computing device; in an example described in FIG. 2, the method 200 is explained in context of the aforementioned system 100, for the ease of explanation.

Referring to FIG. 2, at block 202, user data associated with a plurality of work characteristics of users is collected. The work characteristics of the users define the IT needs of the users for working in an enterprise. The user data is collected by the system 100 from one or more sources in a manner as described earlier in the description.

At block 204, enterprise data associated with capabilities of deployment solutions of the enterprise is collected. The capabilities of the deployment solutions refer to the IT infrastructure that may be deployed for meeting the needs of the users. The enterprise data is also collected by the system 100.

At block 206, a UFP score set comprising rating scores is determined for each of the users. The rating scores in the UFP score sets quantify the levels of needs of the users. The needs of the users can be identified from the collected user data. In an example, the needs of the users are identified as user requirement attributes under the category features that categorize the work characteristics of the users. The UFP score sets are determined by the system 100 in a manner as described earlier in the description.

At block 208, a DFP score set comprising rating scores is determined for each of the deployment solutions. The rating scores in the DFP score sets quantify the levels of capabilities of the deployment solutions. The capabilities of the deployment solutions can be identified from the collected enterprise data. In an example, the capabilities of the deployment solutions are identified as capability attributes under the category features that categorize the work characteristics of the users. The DFP score sets are determined by the system 100 in a manner as described earlier in the description.

In an implementation, outlier users can be identified based on the UFP score sets for all the users and based on the DFP score sets for all the deployment solutions. For identifying the outlier users, the rating scores in the UFP score set for each user are compared with the rating scores in the DFP score sets of all the deployment solutions. In an example, if for a user, the rating score under one or more category features in the UFP score set is more than the rating scores under the same category features in the DFP score sets, then that user is the outlier user.

At block 210, the users are grouped into user segments based on the UFP score sets of the users. Grouping is done such that each user segment includes users having substantially similar needs as identified from the user data. In an implementation, the users can be segmented into user segments by the system 100 by performing the segmentation process as described earlier in the description.

Further, at block 212, a definition of each of the user segments is determined. The definition of a user segment is indicative of a user whose needs defined the characteristics of the user segment around which the users with similar needs are grouped. Such user can be designated as a leader of the user segment.

In an implementation, outlier user segments can be identified based on the definitions of the user segments and based on the DFP score sets for all the deployment solutions as described earlier in the description. In an example, for identifying the outlier user segments, the rating scores in the UFP score set for each user in the user segments are compared with the rating scores in the DFP score sets of the deployment solution. In an example, if for a user in a user segment, the rating score under one or more category features in the UFP score set is more than the rating scores under the same category features in the DFP score sets, then that user segment is the outlier user segment.

At block 214, a number of user segments are found based on a cost of the deployment solutions for the user segments. For this, costs of deployment solutions for different combinations of user segments are computed. The user segments are iteratively reduced one by one and the cost for each combination of user segments is computed based on the cost computation process described earlier in the description. Combinations may include different number of user segments. The cost can be computed by the system 100 based on the definitions of the user segments, the UFP score sets of the users and the DFP score sets of the deployment solutions as described earlier in the description. Based on the costs computed for different combinations of user segments, a number of user segments are found for which the cost of deployment solutions is optimum and the needs of the users in the user segments are met by the deployment solutions. In an example, the number of user segments is the number of user segments for which the cost of deployment solutions is minimum.

Although implementations for the methods and the systems for user segmentation have been described in language specific to structural features, it is to be understood that the present subject matter is not necessarily limited to the specific features described. Rather, the specific features are disclosed and explained in the context of a few implementations for the methods and the systems.

Other advantages of the methods and the systems of the present subject matter will become better understood from the description and claims of an exemplary implementation of the methods and the systems. The methods and the systems of the present subject matter are not restricted to the implementations that are mentioned above in the description.

Although the subject matter has been described with reference to specific implementations, this description is not meant to be construed in a limiting sense. Various modifications of the disclosed implementations, as well as alternate implementations of the subject matter, will become apparent to persons skilled in the art upon reference to the description of the subject matter. It is therefore contemplated that such modifications can be made without departing from the spirit or scope of the present subject matter as defined.

We claim:

1. A processor implemented method of segmentation of users in an enterprise for deployment of enterprise infrastructure, the method comprising:

determining, by a processor (102), for each of the users, a user fingerprint (UFP) score set comprising rating scores that quantify levels of enterprise-level needs of the each user, wherein the enterprise-level needs are associated with a plurality of work characteristics of the users for working in the enterprise;

determining, by the processor (102), for each of deployment solutions of the enterprise, a deployment fingerprint (DFP) score set comprising rating scores that quantify levels of capabilities of the each deployment solution enabled to meet enterprise-level needs of the users, wherein the deployment solutions define the enterprise infrastructure provided to the users;

grouping, by the processor (102), the users into user segments based on the UFP score sets of the users, wherein each of the user segments groups users, from amongst the users, having the UFP score sets relative closer to each other than the UFP score sets of other users;

determining, by the processor (102), a definition of each of the user segments, wherein the definition is indicative of a user whose enterprise-level needs define characteristics of the corresponding user segment; wherein determining of the definition of the each user segment comprise:

determining a centroid vector of the UFP score sets, wherein the centroid vector is indicative of central points of distribution of the UFP score sets;

identifying a UFP score set as a center vector which is farthest from the centroid vector;

grouping the UFP score sets in a cluster, for which a distance with respect to the center vector is less than a distance with respect to the centroid vector, and finding a cluster centroid vector of the cluster;

replacing the center vector with the cluster centroid vector when the center vector is not equal to the cluster centroid vector;

iteratively repeating of steps of grouping further UFP score sets in the cluster based on distance of the points with respect to the center vector and with respect to the centroid vector, till the center vector and the cluster centroid vector are equal; when the center vector and the cluster centroid vector are equal, creating a user segment comprising users associated with the UFP score sets in the cluster;

identifying a UFP score set in the cluster which is nearest to the center vector of the cluster as the definition of the user segment, and adding that UFP score set as an element of a segment centroid set; wherein the UFP score set identified is at least one of a nearest score set and a farthest score set;

revising the UFP score sets by eliminating the UFP score sets that are grouped in the cluster; and iteratively repeating of steps of identifying a farthest UFP score set with respect to the centroid vector, creating further user segments with left-over UFP score sets and determining the definitions of the further user segments till a predefined exit condition is achieved;

removing redundancies, based on the definition of each of the user segments, through one or more automated predefined rules;

determining, based on the removed redundancies, one or more outlier users for a deployment capability;

performing, by a user modeler (114), a outlier identifier (118) and a deployment solution modeler (116) coupled to the processor (102), based on the outlier users, at least one of: (a) excluding the outlier users for the segmentation; (b) modifying a user requirement attributes of the outlier users, to meet the enterprise-level needs of the user by at least one deployment solution; (c) modifying the capabilities of at least one deployment solution, to meet the enterprise-level needs of the outlier users; or (d) designing one or more new deployment solutions for the outlier users; wherein when the user requirements are modified, or the capabilities of the deployment solutions are modified, or new deployment solutions are designed, then the grouping of user into user segments is repeated to create revised user segments, thereby facilitates determining an optimized number of user segments;

finding a number of user segments based on a cost associated with the deployment solutions for the user segments for deployment of the enterprise infrastructure, wherein the cost is computed based on definitions of the user segments, the UFP score sets of the users and the DFP score sets of the deployment solutions.

2. The method as claimed in claim 1 further comprising:
collecting, by the processor (102), user data associated with the plurality of work characteristics of the users;
identifying, from the user data, category features that define the plurality of work characteristics; and
identifying, from the user data, user requirement attributes under each of the category features and for each of the users, wherein the user requirement attributes under the each category feature define the enterprise-level needs and are selected from predefined combinations of attributes that define types of the each category feature, and wherein the rating scores in the UFP score set are associated with the user requirement attributes under the category features.

3. The method as claimed in claim 2, wherein the determining the UFP score set for the each user comprises:

determining the rating scores under the category features from predefined look-up tables, wherein one of the predefined look-up tables corresponds to one of the category features and comprises normalized rating scores for the predefined combinations of attributes that define types of that category feature, and wherein one of the rating score corresponds to one of the category features, which is determined based on matching of the user requirement attributes with one of the predefined combinations of attributes in the corresponding predefined look-up table.

4. The method as claimed in claim 2 further comprising:
collecting, by the processor (102), enterprise data associated with the capabilities of the deployment solutions for meeting the enterprise-level needs of the users;
identifying, from the enterprise data, capability attributes under each of the category features and for each of the deployment solutions, wherein the capability attributes under the each category feature define the capabilities of the deployment solutions and are selected from the predefined combinations of attributes that define types of the each category feature, and wherein the rating scores in the DFP score set are associated with the capability attributes under the category features.

5. The method as claimed in claim 4, wherein the determining the DFP score set for the each deployment solution comprises:

determining the rating scores under the category features from predefined look-up tables, wherein one of the predefined look-up tables corresponds to one of the category features and comprises normalized rating scores for the predefined combinations of attributes that define types of that category feature, and wherein one of the rating scores corresponds to one of the category features, which is determined based on matching of the capability attributes with one of the predefined combinations of attributes in the corresponding predefined look-up table.

6. The method as claimed in claim 1, wherein the predefined exit condition comprises one of:
number of UFP score sets is zero;
number of UFP score sets in the cluster is zero;
number of user segments reaches a predefined limit; and
number of left-over UFP score set is less than a predefined threshold limit.

7. The method as claimed in claim 1, wherein the finding of the number of user segments based on the cost comprises:
for the segment centroid set as a first segment centroid set, computing a cost of deployment solutions as a first cost of the deployment solutions for the user segments for which the definitions are present in the first segment centroid set, and storing the first cost and the first segment centroid set as an element of an output set;
finding a centroid vector of elements of the segment centroid set, wherein the centroid vector is indicative of centrals points of distribution of elements of the segment centroid set;
computing an average distance between the centroid vector and the elements of the segment centroid set;
computing a distance between each pair of elements of the segment centroid set, selecting a pair of elements of the segment centroid set for which the distance is minimum, and setting the elements of the pair as a first element and a second element;
providing the output set for finding the number of user segments based on the cost, when the distance between the selected pair of element is more than the average distance between the centroid vector and the elements of the segment centroid set; and when the distance between the selected pair of elements is less than the average distance between the centroid vector and the elements of the segment centroid set, then:
- determining a second segment centroid set by removing the definition corresponding to the first element from the segment centroid set, and computing a cost of deployment solutions as a second cost of the deployment solutions for the user segments for which the definitions are present in the second segment centroid set, and storing the second cost and the second segment centroid set as an element of the output set;
- determining a third segment centroid set by removing the definition corresponding to the second element from the segment centroid set, and computing a cost of deployment solutions as a third cost of the deployment solutions for the user segments for which the definitions are present in the third segment centroid set, and storing the third cost and the third segment centroid set as an element of the output set;
- when the second cost is less than the third cost, removing the definition corresponding to the first element from the segment centroid set to get a revised segment centroid set;
- when the third cost is less than the second cost, removing the definition corresponding to the second element from the segment centroid set to get a revised segment centroid set;
- iteratively repeating steps of computing a distance between each pair of elements in the revised segment centroid set; selecting a pair of elements for which the distance is minimum; computing further costs of deployment solutions for the user segments by individually removing the element of the pair from the revised segment centroid set; and storing the computed costs and the respective segment centroid sets in the output set, till the number of definitions in the revised segment centroid set is more than number of deployment solutions, and till the distance between the selected pair of elements is less than the average distance between the centroid vector and the elements of the revised segment centroid set; and
- providing the output set for finding the number of user segments based on the costs and the corresponding segment centroid sets in the output set.

8. The method as claimed in claim 7, wherein the computing the cost of deployment solutions comprises:
- finding the users whose enterprise-level needs are met by the capabilities of each of the deployment solutions based on a mapping of the UFP score sets of the users in the user segments and the DFP score sets of the deployment solutions through the definitions of the user segments, wherein the mapping comprises:
  - for each definition of the user segments, identifying the UFP score sets which are relatively closer to that definition than other definitions; and
  - for each DFP score set, identifying the definitions of the user segments which are relatively closer to that DFP score set than other DFP score sets;
- based on the finding, determining a to-be inventory indicative of the enterprise infrastructure for enabling the deployment solutions; and
- determining the cost of the deployment solutions based on the to-be inventory.

9. The method as claimed in claim 4 further comprising:
identifying outlier users from the users, wherein for each of the outlier users the rating score under at least one of the category features in the associated UFP score set is less than the rating scores under the corresponding category feature in the DFP score sets associated with the deployment solutions.

10. The method as claimed in claim 4 further comprising:
identifying outlier user segments from the user segment, wherein for each of the outlier user segment the rating score under at least one of the category features in the UFP score set for a user in the outlier user segment is less than the rating scores under the corresponding category feature in the DFP score sets associated with the deployment solutions.

* * * * *